United States Patent
Tu et al.

(10) Patent No.: US 9,232,097 B2
(45) Date of Patent: Jan. 5, 2016

(54) PERIPHERAL WITH INDEPENDENT FLATBED AND SHEET-FED SCANNING DEVICES

(71) Applicant: AVISION INC., Hsinchu (TW)

(72) Inventors: Ching-Jung Tu, Hsinchu (TW); Te Hsun Liou, Hsinchu (TW); Chung Po Weng, Changhua (TW)

(73) Assignee: Avision Inc. (TW)

( * ) Notice: Subject to any disclaimer, the term of this patent is extended or adjusted under 35 U.S.C. 154(b) by 0 days.

(21) Appl. No.: 14/634,273

(22) Filed: Feb. 27, 2015

(65) Prior Publication Data

US 2015/0304513 A1 Oct. 22, 2015

(30) Foreign Application Priority Data

Apr. 16, 2014 (TW) .............................. 103113793 A (51) Int. Cl.
| | |
|---|---|
| *H04N 1/00* | (2006.01) |
| *H04N 1/10* | (2006.01) |
| *H04N 1/12* | (2006.01) |
| *H04N 1/04* | (2006.01) |

(52) U.S. Cl.
CPC ......... *H04N 1/00557* (2013.01); *H04N 1/0071* (2013.01); *H04N 1/00384* (2013.01); *H04N 1/00408* (2013.01); *H04N 1/00493* (2013.01); *H04N 1/00551* (2013.01); *H04N 1/00572* (2013.01); *H04N 1/0464* (2013.01); *H04N 1/1061* (2013.01); *H04N 1/126* (2013.01)

(58) Field of Classification Search
None
See application file for complete search history.

(56) References Cited

U.S. PATENT DOCUMENTS

| | | | | |
|---|---|---|---|---|
| 6,612,561 | B2 * | 9/2003 | Sekine | H04N 1/00519 271/145 |
| 6,628,433 | B1 * | 9/2003 | Westcott | H04N 1/00538 250/208.1 |
| 8,565,663 | B2 * | 10/2013 | Naito | G03G 15/6514 271/9.09 |
| 8,590,882 | B2 * | 11/2013 | Furuyama | B65H 1/04 271/145 |
| 8,690,147 | B2 * | 4/2014 | Okuchi | B65H 1/04 271/162 |
| 8,711,443 | B2 * | 4/2014 | Tu | H04N 1/00522 358/474 |
| 8,757,611 | B2 * | 6/2014 | Shih | B65H 3/54 271/121 |
| 2011/0292464 | A1 * | 12/2011 | Shih | H04N 1/00713 358/474 |

FOREIGN PATENT DOCUMENTS

| | | | |
|---|---|---|---|
| TW | M417261 U1 * | 12/2011 | |
| TW | M449704 U1 * | 4/2013 | |

* cited by examiner

Primary Examiner — Paul F Payer (57) ABSTRACT

A peripheral comprises a flatbed scanning device, a sheet-fed scanning device and a multi-stage input tray. The flatbed scanning device comprises a rotatable upper cover covering a first document, on which a flatbed scan is performed. The sheet-fed scanning device abuts upon the upper cover and performs a sheet-fed scan on a second document. The multi-stage input tray comprises a first tray and a second tray. The first tray is disposed on the upper cover and has a supporting surface for supporting the second document. The second tray, pivotally connected to the first tray, assists in supporting the second document in a deployed mode, and forms an inverse-V-shaped structure with the supporting surface in a retracted mode.

19 Claims, 9 Drawing Sheets

PERIPHERAL WITH INDEPENDENT FLATBED AND SHEET-FED SCANNING DEVICES

This application claims priority of No. 103113793 filed in Taiwan R.O.C. on Apr. 16, 2014 under 35 USC 119, the entire content of which is hereby incorporated by reference.

BACKGROUND OF THE INVENTION

1. Field of the Invention

The present invention relates to a peripheral, and more particularly to a peripheral with independent flatbed and sheet-fed scanning devices.

2. Related Art

Figure 1:
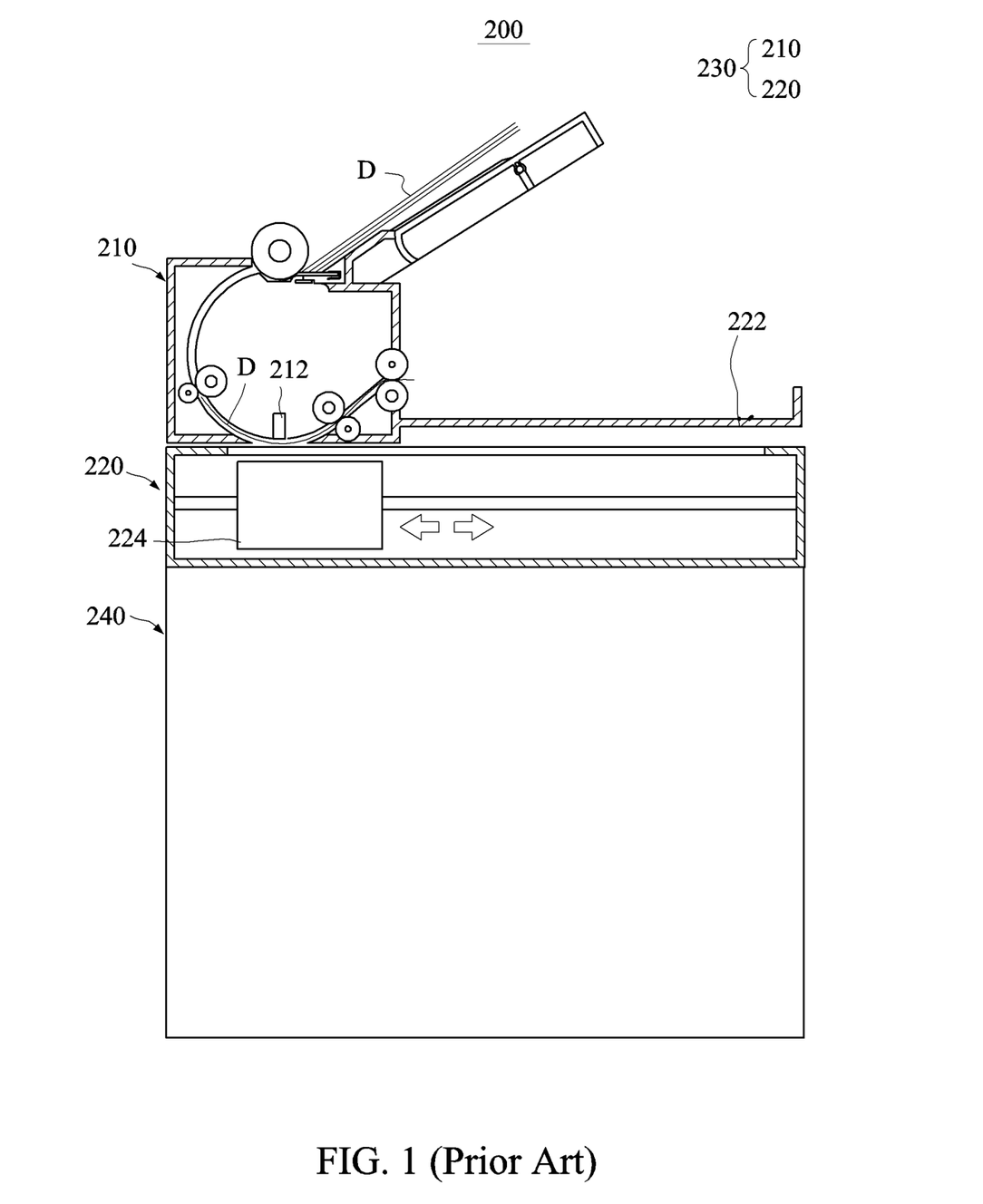
FIG. 1 shows a schematic view of a conventional copier.

FIG. 1 shows a schematic view of a conventional copier 200. Referring to FIG. 1, the conventional copier 200 usually comprises a scanning device 230 and a printing device 240. The scanning device 230 comprises a flatbed scanning unit 220 and a sheet-fed scanning unit 210 so that the user can perform a flatbed scan operation and a sheet-fed scan operation. The flatbed scanning unit 220 can utilize a movable scanning module 224 to scan a bound book, and the sheet-fed scanning unit 210 can scan a plurality of documents D at one time. However, the sheet-fed scanning unit 210 is disposed on an upper cover 222 of the flatbed scanning unit 220, wherein the upper cover 222 also functions as a document storage tray for storing the documents D scanned by the sheet-fed scanning unit 210. The drawback of such the design resides in that the user still has to exert a considerable force to lift up the bulky sheet-fed scanning unit 210 when the flatbed scan is performed. More particularly, when the scanning device 230 is designed to scan the A3-sized document, the sheet-fed scanning unit 210 becomes bulkier. In addition, a sensor 212 in the sheet-fed scanning unit 210 is not suitable for the environment with the frequent shaking. In order to disable the sensor 212 from displacement upon the lifting operation of the upper cover 222, and further to strengthen the structure design, the manufacturing cost and weight are increased.

SUMMARY OF THE INVENTION

Accordingly, the present invention has been proposed to solve the problems of the prior art, and it is an object of the present invention to provide a peripheral with independent flatbed and sheet-fed scanning devices. With the independent design, the user does not need to waste the manpower to perform the flatbed scan. With the duplex sheet-fed scan function, the user can conveniently utilize this peripheral to perform a duplex scan on a hard document.

To achieve the above-identified object, the present invention provides a peripheral comprising a flatbed scanning device, a sheet-fed scanning device and a multi-stage input tray. The flatbed scanning device comprises a rotatable upper cover covering a first document, on which a flatbed scan is performed. The sheet-fed scanning device abuts upon the upper cover and performs a sheet-fed scan on a second document. The multi-stage input tray comprises a first tray and a second tray. The first tray is disposed on the upper cover and has a first supporting surface for supporting the second document. The second tray is pivotally connected to the first tray, assists in supporting the second document in a deployed mode, and forms an inverse-V-shaped structure with the first supporting surface in a retracted mode.

The present invention further provides a peripheral comprising a flatbed scanning device, a sheet-fed scanning device and a printing device. The flatbed scanning device comprises a rotatable upper cover covering a first document, on which a flatbed scan is performed. The sheet-fed scanning device abuts upon and the upper cover and performs a sheet-fed scan on a second document supported on the upper cover. The flatbed scanning device and the sheet-fed scanning device are disposed on and electrically connected to the printing device, the printing device performs a printing operation according to an output of the flatbed scanning device or the sheet-fed scanning device, and an output tray of the printing device for supporting printed media is disposed under the sheet-fed scanning device.

With the above-mentioned aspects, a peripheral having a flatbed scanning device and a sheet-fed scanning device abutting upon the flatbed scanning device can be provided, and the flatbed scanning device and the sheet-fed scanning device are no longer tied together, so that the user does not need to waste the manpower to lift up the scanning module of the sheet-fed scanning device. In addition, the sheet-fed scanning device and the printing device can work together to perform the duplex scan and merged print on the hard document so as to provide a convenient operation function for the user. Furthermore, the flatbed scanning device, the sheet-fed scanning device and the printing device can work together to perform the merged scan and print on two documents so as to provide the diversified operation function for the user. In addition, the upper cover is utilized to support the second document by effectively utilizing the space and the function of each structure, thereby achieving the convenient effect in use.

Further scope of the applicability of the present invention will become apparent from the detailed description given hereinafter. However, it should be understood that the detailed description and specific examples, while indicating preferred embodiments of the present invention, are given by way of illustration only, since various changes and modifications within the spirit and scope of the present invention will become apparent to those skilled in the art from this detailed description.

DETAILED DESCRIPTION OF THE INVENTION

The present invention will be apparent from the following detailed description, which proceeds with reference to the accompanying drawings.

Figure 2A:
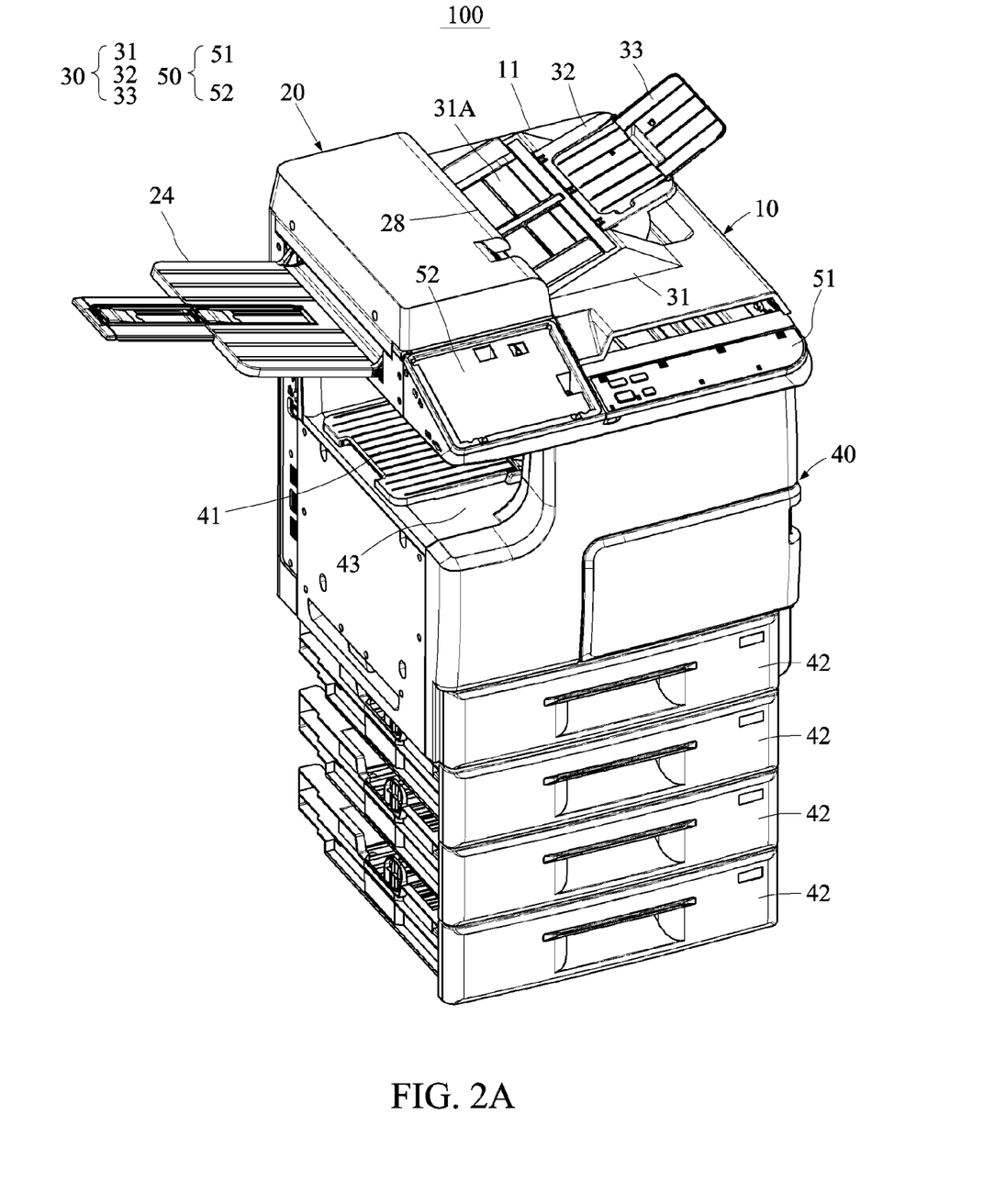
FIG. 2A shows a pictorial view of a peripheral according to a first embodiment of the present invention.
Figure 2B:
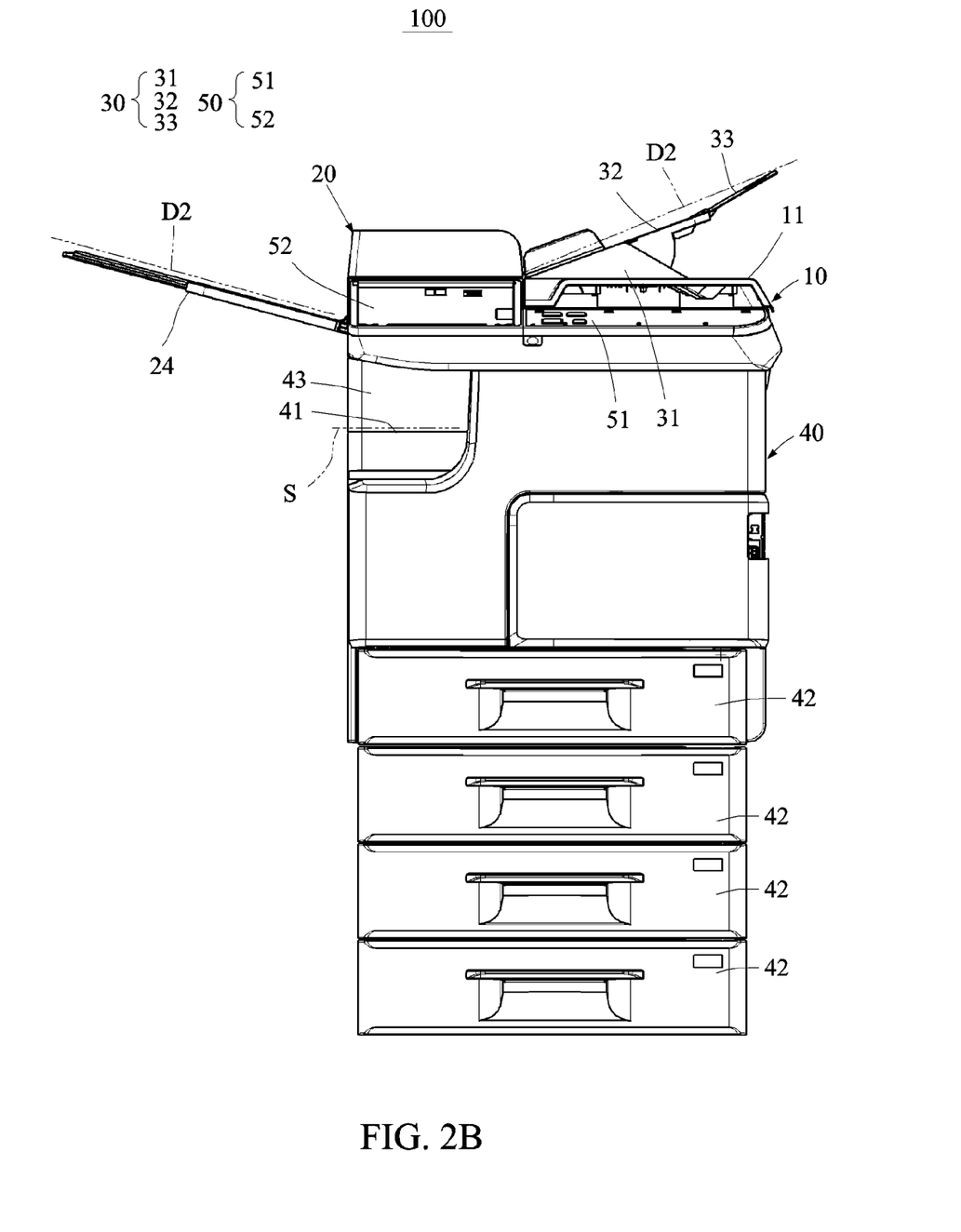
FIG. 2B shows a front view of the peripheral according to the first embodiment of the present invention.
Figure 3:
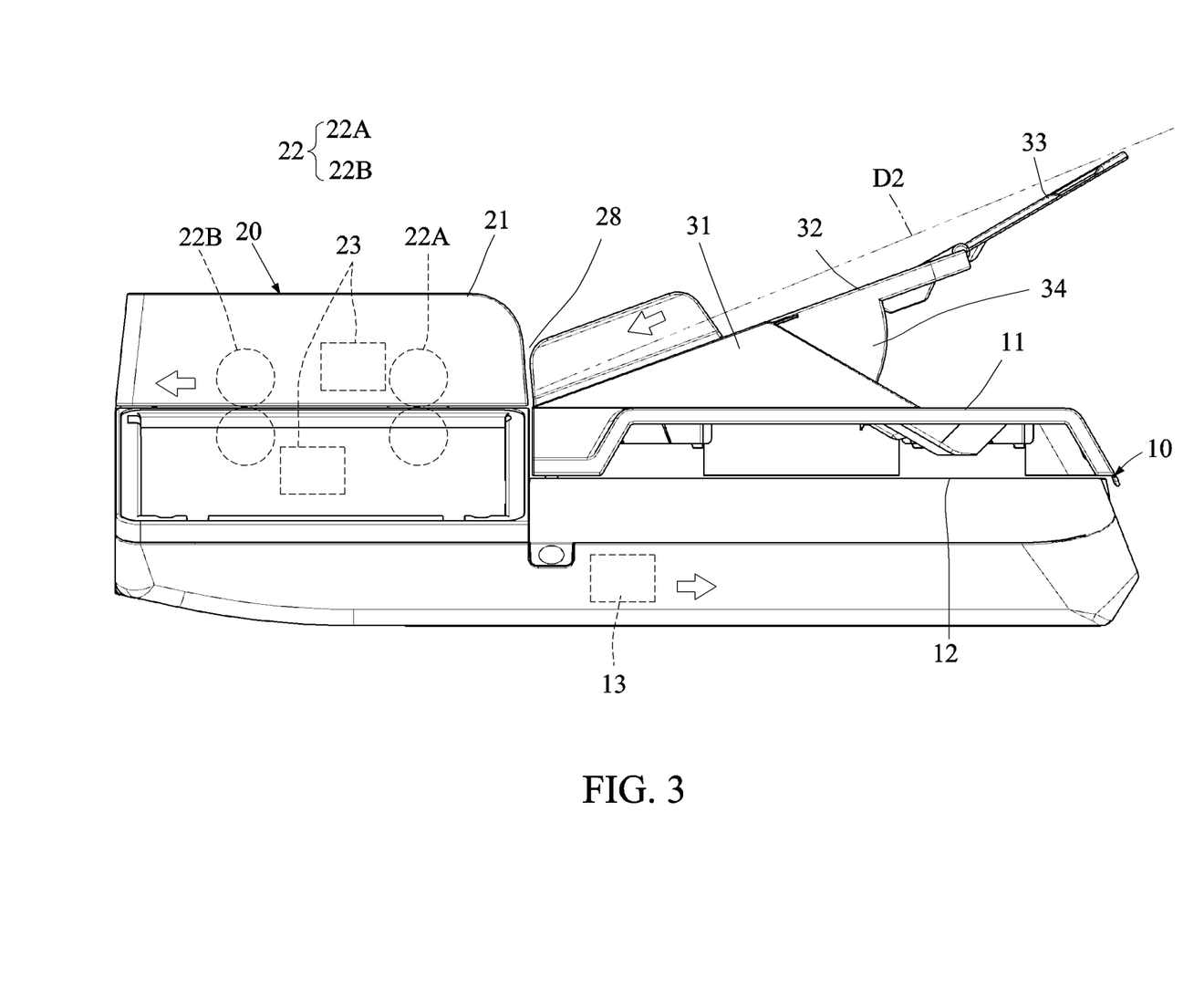
FIG. 3 shows a partial front view of the peripheral according to the first embodiment of the present invention.
Figure 4:
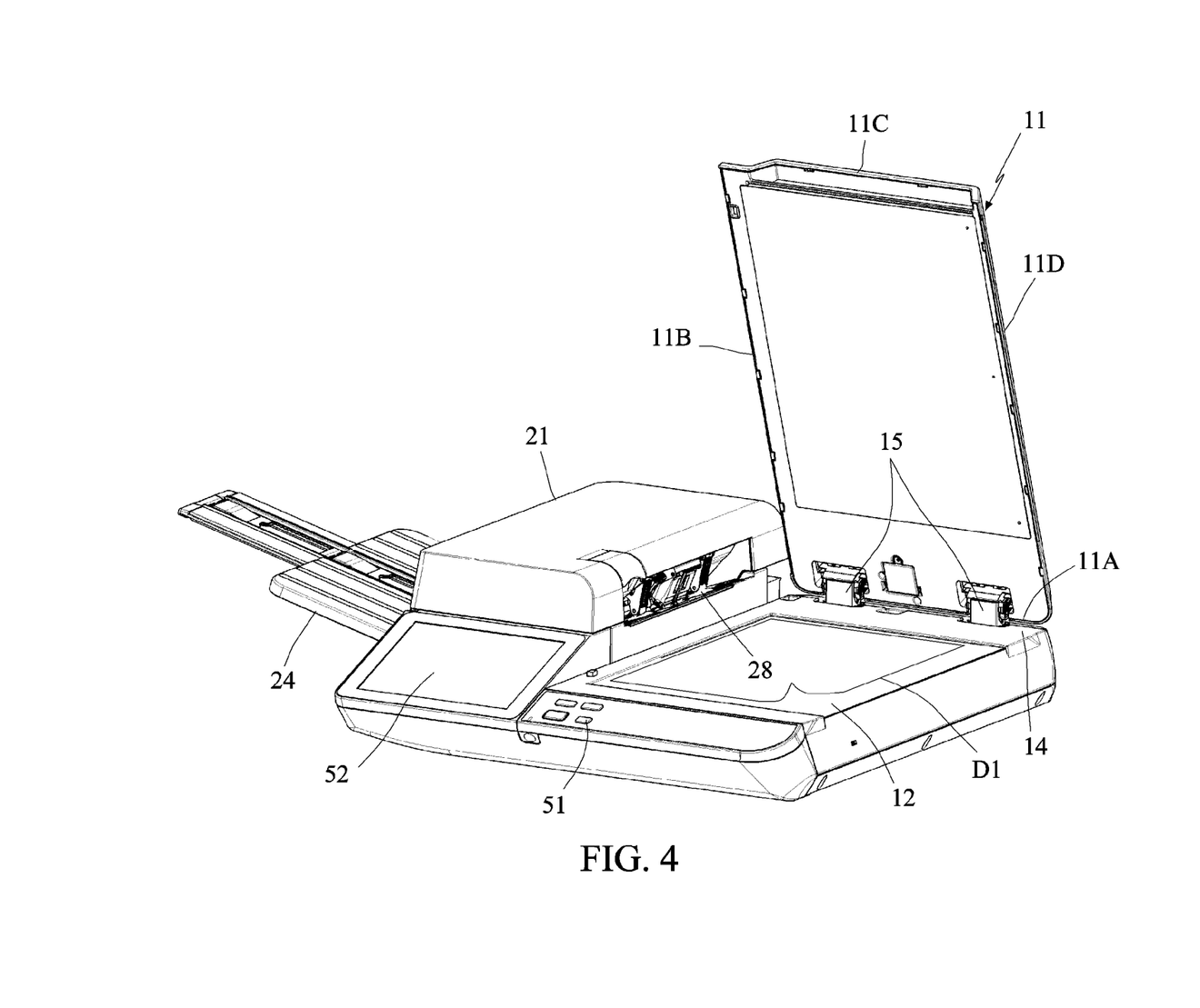
FIG. 4 shows a partial pictorial view of the peripheral according to the first embodiment of the present invention.

FIGS. 2A to 4 show a pictorial view, a front view, a partial front view and a partial pictorial view of a peripheral 100 according to a first embodiment of the present invention, respectively. It is worth noting that the left side plate of the peripheral 100 in FIGS. 2A and 2B has been removed, FIGS. 3 and 4 do not show a printing device 40 of the peripheral 100, and an upper cover 11 of FIG. 4 is in an opened state.

As shown in FIGS. 2A to 4, the peripheral 100 of this embodiment may be a copier capable of serving as a scanner as well as a printer, may be an independent machine, and may also be a machine connected to a network or an electronic apparatus. The peripheral 100 comprises a flatbed scanning device 10, a sheet-fed scanning device 20 and a multi-stage input tray 30.

The flatbed scanning device 10 comprises a rotatable upper cover 11 for covering a first document D1, on which a flatbed scan is performed. That is, a scanning module is moved to scan the stationary document. The user can lift up the upper cover 11, then place the first document D1, and then close the upper cover 11. The first document D1 may be an ordinary document, a book, an identity card, a card or the like.

The sheet-fed scanning device 20 abuts upon the upper cover 11 and performs a sheet-fed scan on a second document D2. That is, a stationary scanning module is used to scan a moving document. In detail, a transporting mechanism 22 (see FIG. 3), comprising transporting rollers 22A and 22B, in the sheet-fed scanning device 20 is used to move the document. For the upright peripheral 100 shown in FIGS. 2A and 2B, the sheet-fed scanning device 20 abuts upon the upper cover 11 in the horizontal direction. The sheet-fed scanning device 20 is no longer mounted on the upper cover 11. Thus, the user needs not exert other force to lift up the sheet-fed scanning device 20 upon lifting the upper cover 11.

The multi-stage input tray 30 comprises a first tray 31 and a second tray 32. The first tray 31 disposed on the upper cover 11 has a first supporting surface 31A for supporting the second document D2. The second tray 32 is pivotally connected to the first tray 31.

In the first mode shown in FIG. 3, the upper cover 11 is closed relative to a scan platen 12 of the flatbed scanning device 10, and the multi-stage input tray 30 guides the second document D2 into an entrance 28 of the sheet-fed scanning device 20. That is, after the upper cover 11 is closed, the upper cover 11 becomes one portion of the multi-stage input tray 30. The multi-stage input tray 30 may further comprise a third tray 33, which is connected to second tray 32 and assists in supporting the second document D2 in a used state. The third tray 33 may also be retracted onto the second tray 32, and more particularly be retracted into a concave portion of the second tray 32.

In the second mode shown in FIG. 4, the upper cover 11 is opened relative to the scan platen 12, and the multi-stage input tray 30 cannot guide the second document D2 into the entrance 28. At this time, the user may place the first document D1 to perform the flatbed scan.

In addition, as shown in FIGS. 2A and 2B, the peripheral 100 may further comprise the printing device 40. The flatbed scanning device 10 and the sheet-fed scanning device 20 are disposed on and electrically connected to the printing device 40. The printing device 40 performs a printing operation according to an output of the flatbed scanning device 10 or the sheet-fed scanning device 20. The printing device 40 has supply trays 42 for supplying various formats of media, such as sheets, cards, slides and the like.

In this embodiment, an output tray 41 of the printing device 40 for supporting printed media S is disposed in a receptacle 43 under the sheet-fed scanning device 20. Thus, in the condition shown in FIGS. 2A and 2B, the user can uniformly use the right hand to take or place to-be-scanned documents, and the left hand to take the scanned or printed documents or media, thereby an ordered operation method is provided. In addition, the receptacle 43 may also function as a heat dissipating space for the flatbed scanning device 10, the sheet-fed scanning device 20 and the printing device 40. Thus, the portions of the flatbed scanning device 10, the sheet-fed scanning device 20 and the printing device 40 facing the receptacle 43 may be formed with ventilation slots or installed with heat dissipating fans, which can also dissipate the heat of the printed media S.

Referring to FIGS. 3 and 4, the sheet-fed scanning device 20 comprises a case portion 21, a transporting mechanism 22, a fixed scanning module 23 and a discharge tray 24. The case portion 21 abuts upon the upper cover 11. The transporting mechanism 22 is disposed in the case portion 21. The fixed scanning module 23 is disposed in the case portion 21 and scans the second document D2 transported past the fixed scanning module 23 by the transporting mechanism 22. There may be one or two fixed scanning modules 23. The discharge tray 24 for supporting the scanned second document D2 is connected to the case portion 21.

Referring again to FIG. 3, the flatbed scanning device 10 comprises a movable scanning module 13 for scanning the simplex image of the first document D1, and the sheet-fed scanning device 20 comprises two fixed scanning modules 23 for scanning the front side image and the reverse side image of the second document D2. The moving direction of the movable scanning module 13 is substantially parallel to the moving direction of the second document D2. Because the sheet-fed scanning device 20 of this embodiment has the straightforward type transporting path, the sheet-fed scanning device 20 can scan the hard document, such as the certificate or card, can perform the duplex scan, and can print the duplex scan result on the same side of the medium. The user can achieve this effect without performing the conventional complicated operations. In addition, because the peripheral 100 has three scanning modules, it is possible to utilize the flatbed scanning device 10 and the sheet-fed scanning device 20 to perform the scanning concurrently, and the scan results are printed on two sides of the medium. For example, the flatbed scanning device 10 scans an application form, the sheet-fed scanning device 20 scans the front and reverse sides of the identity card, and the printing device 40 can perform the duplex printing to copy the contents of the application form onto the first side of the medium, and copy the contents of the front and reverse sides of the identity card onto the second side of the medium. The user can rapidly obtain a copied form having the reverse side printed with the contents of the front and reverse sides of the identity card, so the application is very convenient.

Referring to FIG. 4, a first side 11A of the upper cover 11 is pivotally connected to a housing 14 of the flatbed scanning device 10, and the sheet-fed scanning device 20 abuts upon a second side 11B of the upper cover 11, which is substantially perpendicularly connected to the first side 11A of the upper cover 11. In this embodiment, the upper cover 11 is mounted on the housing 14 through two hinges 15, and the upper cover 11, upon closing, may also be moved vertically relative to the housing 14 to fit with the scan operation of the first document D1 with the considerable thickness.

In addition, as shown in FIGS. 2A to 4, the peripheral 100 of this embodiment further comprises a user interface 50, which is disposed on the housing 14 of the flatbed scanning device 10, abuts upon a third side 11C of the upper cover 11, and is electrically connected to the flatbed scanning device 10, the sheet-fed scanning device 20 and the printing device 40, so that the user can perform the control and monitor operations through the user interface 50. The above-mentioned copy operations may be performed through the user interface 50. The third side 11C of the upper cover 11 is substantially perpendicularly connected to the second side 11B of the upper cover 11. In this embodiment, the user interface 50 comprises a set of keys 51 and a display device 52. The set of keys 51 is disposed on the housing 14 and abuts upon the third side 11C of the upper cover 11. The display device 52 is rotatably disposed and abuts upon the set of keys 51 and the sheet-fed scanning device 20. The user can perform the preview operation through the display device 52, and perform the adjusting or verifying operation through the set of keys. The display device 52 can display the information, and may further function as a touch screen, through which the user can input instructions, whereas the keys 51 serve as quick function keys. It is worth noting that the pivotally connecting portion of this embodiment is located on the first side 11A of the upper cover 11, as shown in FIG. 4. In another example, however, the pivotally connecting portion may also be located on the fourth side 11D or third side 11C of the upper cover 11.

It is worth noting that, in the definition of another example, the first tray 31 may be regarded as one portion of the upper cover 11. Thus, the sheet-fed scanning device 20 can perform a sheet-fed scan on the second document D2 placed on the upper cover 11.

Figure 5:
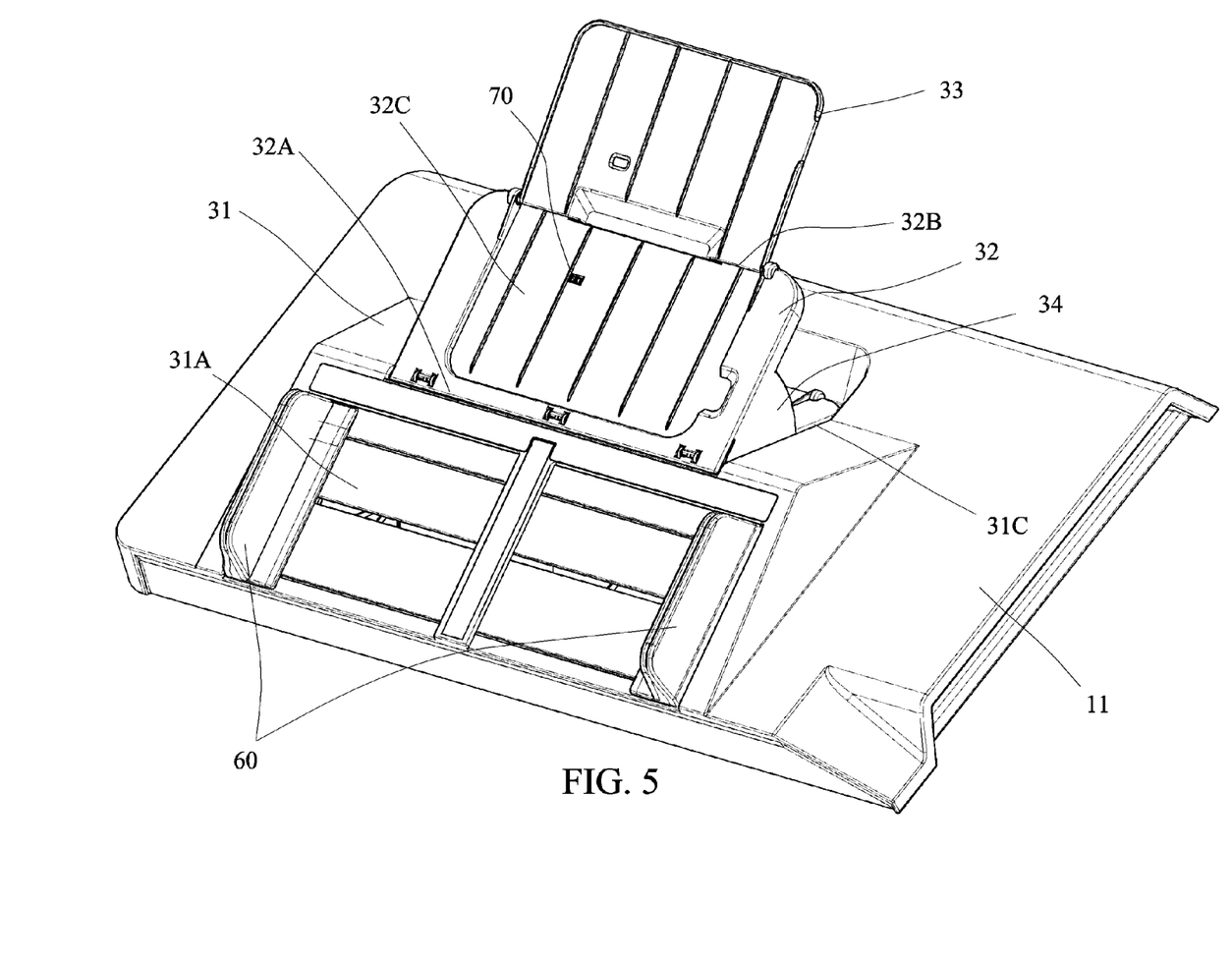
FIGS. 5 and 6 show pictorial views of configuration states of an upper cover of the peripheral according to the first embodiment of the present invention.
Figure 6:
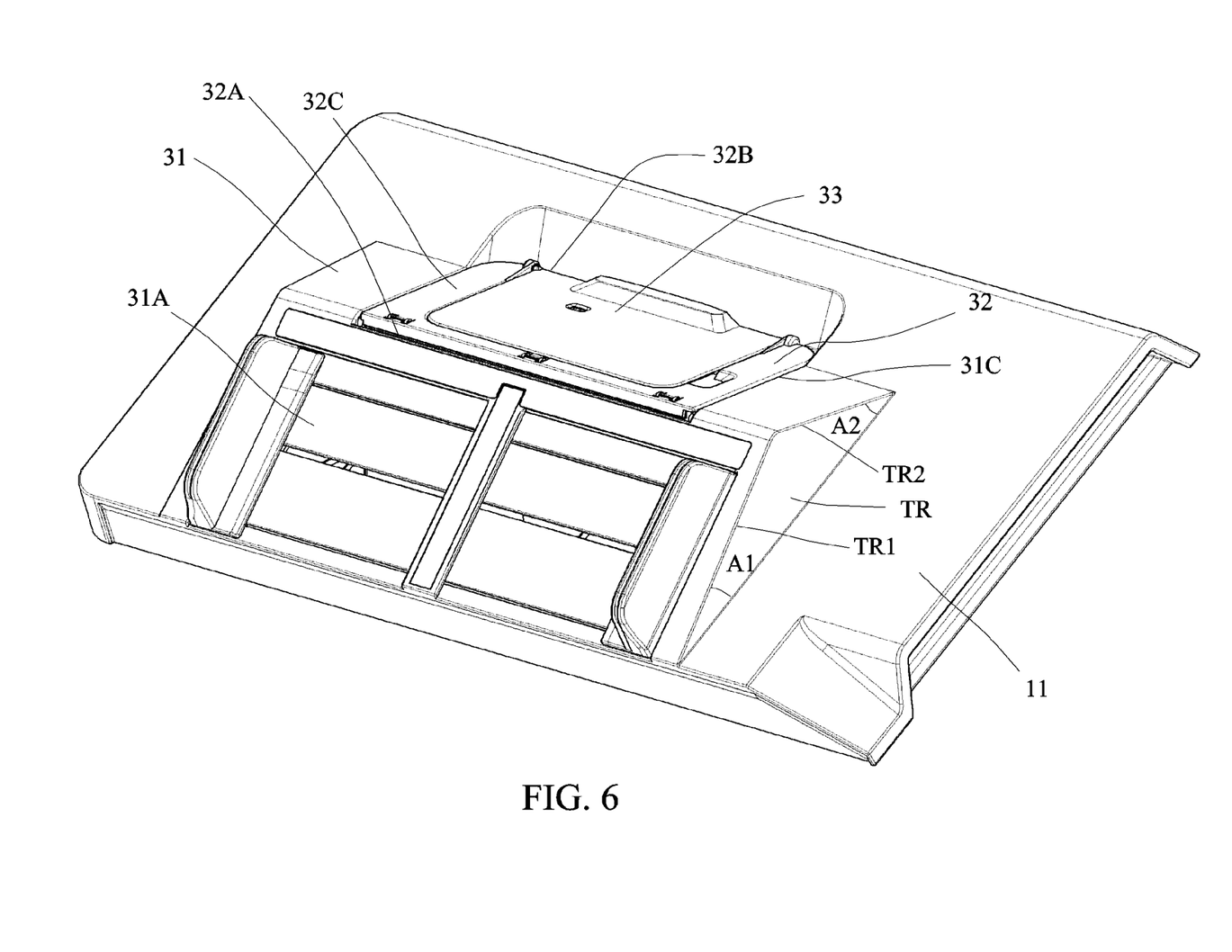

FIGS. 5 and 6 show pictorial views of two configuration states of the upper cover 11 of the peripheral 100 according to the first embodiment of the present invention. As shown in FIGS. 5 and 6, the second tray 32 assists in supporting the second document D2 in a deployed mode, and the second tray 32 forms an inverse-V-shaped structure with the first supporting surface 31A in a retracted mode. That is, the third tray 33 and the first supporting surface 31A also form the inverse-V-shaped structure in the retracted mode. In addition, the second tray 32 has a first side 32A and a second side 32B disposed opposite the first side 32A, and is for supporting a second supporting surface 32C of the second document D2. The first side 32A of the second tray 32 is pivotally connected to the first tray 31. The second side 32B of the second tray 32 is far away from the upper cover 11 in a deployed mode (FIG. 5), and approaches or directly contacts the upper cover 11 in a retracted mode (FIG. 6). The first supporting surface 31A, the second supporting surface 32C and the upper cover 11 form a triangular prism in the retracted mode.

Furthermore, the second tray 32 is retracted into a concave portion 31C of the first tray 31 in the retracted mode, and the concave portion 31C may be formed with an engaging structure (not shown) for engaging with the second tray 32 so that the peripheral 100 can be smoothly transported. In this embodiment, the first tray 31 has a triangular cross-section TR, acute angles A1 and A2 are formed between the upper cover 11 and two edges TR1 and TR2 of the triangular cross-section TR, and a sum of the lengths of the two edges TR1 and TR2 is greater than 210 millimeters. The acute angle A1 between the first tray 31 and the upper cover 11 ranges from 10 to 40 degrees. Furthermore, the peripheral 100 further comprises a document width detector 60, which is disposed on the first tray 31 and detects the width of the second document D2. Although the document width detector 60 depicted in the drawing only comprises only two sheet guiding plates, the sheet guiding plates may be connected to a detection unit to perform the width detection. In addition, the peripheral 100 may further comprise a document length detector 70, which is disposed on the second tray 32 and detects the length of the second document D2. Because a considerable space is still present under the second tray 32 in the deployed mode and the retracted mode, one or multiple document length detectors 70 can be installed in the space between the second tray 32 and the first tray 31, thereby increasing the function of the peripheral 100 without enlarging the size of the peripheral 100.

Figure 7:
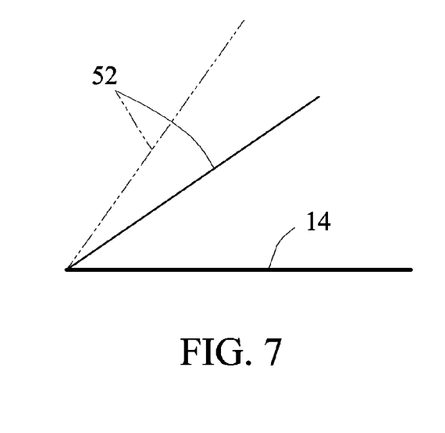
FIG. 7 shows a schematic view of a relative relationship between a display device and a housing.

FIG. 7 shows a schematic view of the relative relationship between the display device 52 and the housing 14. Referring to FIG. 7, the relative angle between the display device 52 and the housing 14 is adjustable, thereby facilitating the user in adjusting the viewing angle.

Figure 8:
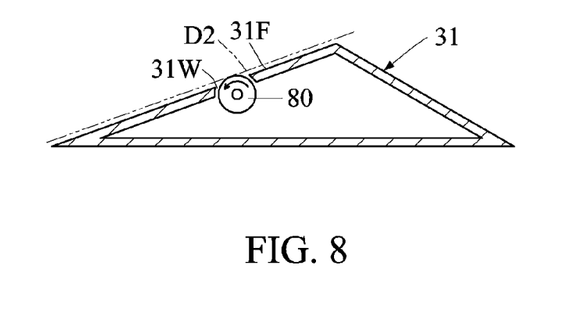
FIG. 8 shows a schematic view of a first tray and a roller.

FIG. 8 shows a schematic view of the first tray 31 and a roller 80. Referring to FIG. 8, the peripheral 100 may further comprise the roller 80, which is disposed in the first tray 31 and is exposed partially through an opening 31W of the first tray 31 to contact the second document D2 on a front side 31F of the first tray 31. Rotating the roller 80 can move the second document D2 downwards, so that the second document D2 can easily contact the sheet feeding or sheet separating mechanism of the sheet-fed scanning device 20, thereby avoiding the problem that a few second documents D2 cannot smoothly touch the sheet feeding or sheet separating mechanism of the sheet-fed scanning device 20.

Figure 9:
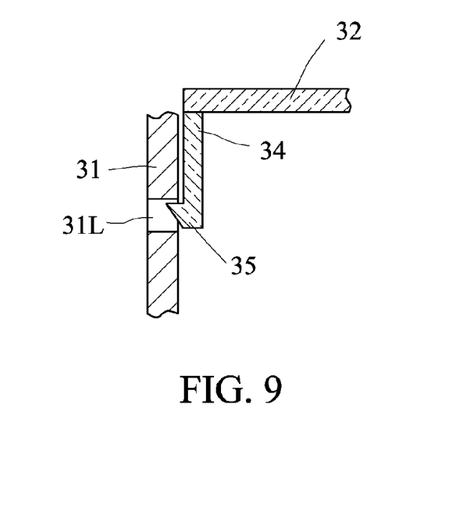
FIGS. 9 and 10 show schematic views of two states of the side wing, the fastening component and the first tray.
Figure 10:
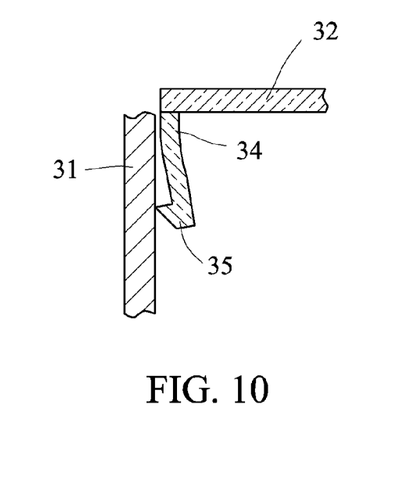

FIGS. 9 and 10 show schematic views of two states of the side wing, the fastening component and the first tray. Referring to FIGS. 5, 9 and 10, the multi-stage input tray 30 further comprises a side wing 34 and a fastening component 35. The side wing 34 is connected to the second tray 32. The fastening component 35 is connected to the side wing 34 and the first tray 31, and is fastened to the first tray 31 via the fastening hole 31L, for example, in the deployed mode to support the second tray 32, and is unfastened from the first tray 31 in the retracted mode. Because the second tray 32 is pivotally connected to the first tray 31, the fastening component 35 travels along an arced path on the first tray 31. The resilience of the side wing 34 provides the fastening and unfastening functions.

Figure 11:
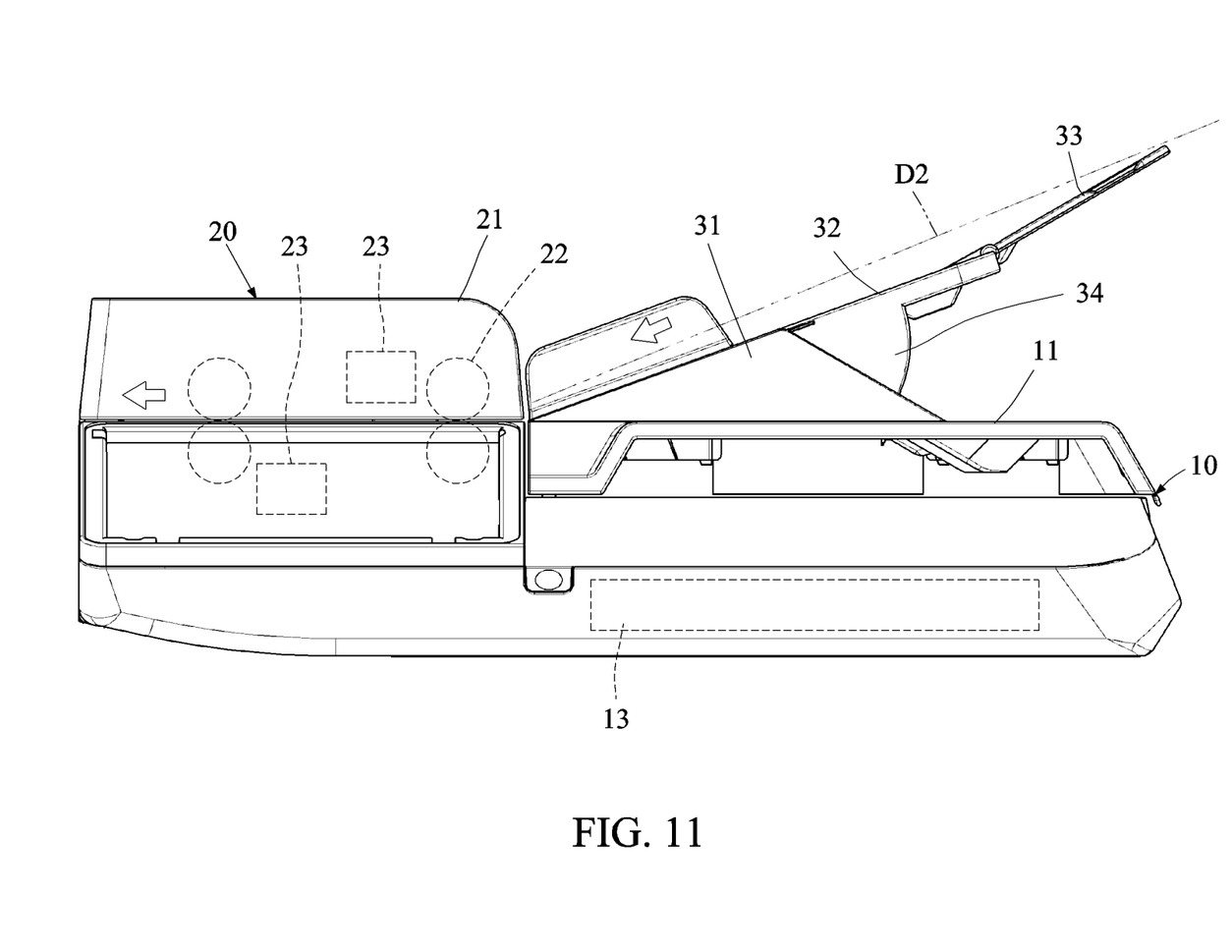
FIG. 11 shows a partial front view of a peripheral according to a second embodiment of the present invention.

FIG. 11 shows a partial front view of a peripheral according to a second embodiment of the present invention. As shown in FIG. 11, this embodiment is similar to the first embodiment except that the moving direction of the movable scanning module 13 is substantially perpendicular to the moving direction of the second document D2, and the advantage thereof is to shorten the length of the movable scanning module 13 upon fitting with the size of the first document D1.

With the above-mentioned embodiments, a peripheral having a flatbed scanning device and a sheet-fed scanning device abutting upon the flatbed scanning device can be provided, and the flatbed scanning device and the sheet-fed scanning device are no longer tied together, so that the user does not need to waste the manpower to lift up the scanning module of the sheet-fed scanning device. In addition, the sheet-fed scanning device and the printing device can work together to perform the duplex scan and merged print on the hard document so as to provide a convenient operation function for the user. Furthermore, the flatbed scanning device, the sheet-fed scanning device and the printing device can work together to perform the merged scan and print on two documents so as to provide the diversified operation function for the user. In addition, the upper cover is utilized to support the second document by effectively utilizing the space and the function of each structure, thereby achieving the convenient effect in use.

While the present invention has been described by way of examples and in terms of preferred embodiments, it is to be understood that the present invention is not limited thereto. To the contrary, it is intended to cover various modifications. Therefore, the scope of the appended claims should be accorded the broadest interpretation so as to encompass all such modifications.

What is claimed is:

1. A peripheral, comprising:
a flatbed scanning device comprising a rotatable upper cover covering a first document, on which a flatbed scan is performed;
a sheet-fed scanning device abutting upon the upper cover and performing a sheet-fed scan on a second document; and
a multi-stage input tray comprising:
a first tray, which is disposed on the upper cover and has a first supporting surface for supporting the second document; and
a second tray, which is pivotally connected to the first tray, assists in supporting the second document in a deployed mode, and forms an inverse-V-shaped structure with the first supporting surface in a retracted mode.

2. The peripheral according to claim 1, wherein:
in a first mode, the upper cover is closed relative to a scan platen of the flatbed scanning device, and the multi-stage input tray guides the second document into an entrance of the sheet-fed scanning device; and
in a second mode, the upper cover is opened relative to the scan platen, and the multi-stage input tray cannot guide the second document into the entrance.

3. The peripheral according to claim 1, further comprising:
a printing device, wherein the flatbed scanning device and the sheet-fed scanning device are disposed on and electrically connected to the printing device, and the printing device performs a printing operation according to an output of the flatbed scanning device or the sheet-fed scanning device.

4. The peripheral according to claim 3, wherein an output tray of the printing device for supporting printed media is disposed under the sheet-fed scanning device.

5. The peripheral according to claim 3, wherein a first side of the upper cover is pivotally connected to a housing of the flatbed scanning device, and the sheet-fed scanning device abuts upon a second side of the upper cover, and the second side of the upper cover is substantially perpendicularly connected to the first side of the upper cover.

6. The peripheral according to claim 5, further comprising:
a user interface, which is disposed on the housing of the flatbed scanning device, abuts upon a third side of the upper cover, and is electrically connected to the flatbed scanning device, the sheet-fed scanning device and the printing device, wherein a user performs control and monitor operations through the user interface, and the third side of the upper cover is substantially perpendicularly connected to the second side of the upper cover.

7. The peripheral according to claim 6, wherein the user interface comprises a set of keys and a display device, the set of keys is disposed on the housing and abuts upon the third side of the upper cover, and the display device is rotatably disposed, and abuts upon the set of keys and the sheet-fed scanning device.

8. The peripheral according to claim 1, wherein the second tray is retracted into a concave portion of the first tray in the retracted mode.

9. The peripheral according to claim 1, wherein the first tray has a triangular cross-section, acute angles are formed between the upper cover and two edges of the triangular cross-section, and a sum of lengths of the two edges is greater than 210 millimeters.

10. The peripheral according to claim 1, wherein an angle between the first tray and the upper cover ranges from 10 to 40 degrees.

11. The peripheral according to claim 1, further comprising a document width detector, which is disposed on the first tray and detects a width of the second document.

12. The peripheral according to claim 1, further comprising a document length detector, which is disposed on the second tray and detects a length of the second document.

13. The peripheral according to claim 1, further comprising a roller, which is disposed in the first tray, and contacts the second document on a front side of the first tray partially through an opening of the first tray.

14. The peripheral according to claim 1, wherein the multi-stage input tray further comprises a third tray, which is connected to the second tray and assists in supporting the second document in a used state.

15. The peripheral according to claim 1, wherein the multi-stage input tray further comprises a side wing and a fastening component, the side wing is connected to the second tray, and the fastening component is connected to the side wing and the first tray, is fastened to the first tray in the deployed mode to support the second tray, and is further unfastened from the first tray in the retracted mode.

16. The peripheral according to claim 1, wherein the sheet-fed scanning device comprises:
a case portion abutting upon the upper cover;
a transporting mechanism disposed in the case portion; and
a fixed scanning module, which is disposed in the case portion and scans the second document transported past the fixed scanning module by the transporting mechanism.

17. The peripheral according to claim 16, wherein the sheet-fed scanning device further comprises:
a discharge tray, which is connected to the case portion, and supports the second document being scanned.

18. The peripheral according to claim 1, wherein the second tray has a first side and a second side disposed opposite the first side, and a second supporting surface for supporting the second document, wherein the first side of the second tray is pivotally connected to the first tray, the second side of the second tray is moved away from the upper cover in the deployed mode, and approaches or directly contacts the upper cover in the retracted mode, wherein the first supporting surface, the second supporting surface and the upper cover in the retracted mode form a triangular prism.

19. The peripheral according to claim 1, wherein:
the flatbed scanning device comprises a movable scanning module for scanning a simplex image of the first document; and
the sheet-fed scanning device comprises two fixed scanning modules for scanning a front side image and a reverse side image of the second document.

* * * * *